(12) United States Patent
Liu et al.

(10) Patent No.: US 9,389,652 B2
(45) Date of Patent: Jul. 12, 2016

(54) OPTICAL DISC DRIVE INSTALLATION MECHANISM, AND OUTER FRAME FOR INSTALLING OPTICAL DISC DRIVE

(71) Applicant: Huawei Technologies Co., Ltd., Shenzhen, Guangdong (CN)

(72) Inventors: Lianjun Liu, Shenzhen (CN); Youhe Ke, Shenzhen (CN); Chengpeng Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 45 days.

(21) Appl. No.: 14/562,529

(22) Filed: Dec. 5, 2014

(65) Prior Publication Data

US 2015/0092341 A1    Apr. 2, 2015

Related U.S. Application Data

(63) Continuation of application No. PCT/CN2013/070625, filed on Jan. 17, 2013.

(30) Foreign Application Priority Data

Jun. 29, 2012   (CN) .......................... 2012 1 0222885

(51) Int. Cl.
  *G06F 1/16* (2006.01)
  *G06F 1/18* (2006.01)
(52) U.S. Cl.
  CPC ...................................... *G06F 1/187* (2013.01)
(58) Field of Classification Search
  CPC ........................................................ G06F 1/187
  See application file for complete search history.

(56) References Cited

U.S. PATENT DOCUMENTS

| 2005/0038926 A1 | 2/2005 | Chang |
| 2007/0274034 A1 | 11/2007 | Yang et al. |
| 2008/0144274 A1 | 6/2008 | Chen et al. |
| 2012/0314362 A1* | 12/2012 | Hsieh .................. G11B 33/128 361/679.39 |

FOREIGN PATENT DOCUMENTS

| CN | 2704872 Y | 6/2005 |
| CN | 2859633 Y | 1/2007 |
| CN | 101078945 A | 11/2007 |
| CN | 200983262 Y | 11/2007 |
| CN | 200990036 Y | 12/2007 |
| CN | 201426706 Y | 3/2010 |
| CN | 202166922 U | 3/2012 |
| CN | 102445954 A | 5/2012 |
| CN | 102749973 A | 10/2012 |
| JP | H10243072 A | 9/1998 |

* cited by examiner

*Primary Examiner* — Anthony Q Edwards

(57) ABSTRACT

Disclosed are an optical disc drive installation mechanism, and an outer frame for installing an optical disc drive. The optical disc drive installation mechanism includes: an optical disc drive module and an outer frame which is configured to insert or pull out the optical disc drive module, and a buckle is connected to a side surface of the optical disc drive module; a buckle limiting hole is disposed on a first side surface of the outer frame; and a groove is further disposed on an outer wall on the first side surface of the outer frame, a fixedly connected spacing elastomer is disposed on an inner wall on a second side surface of the outer frame, the spacing elastomer and the first elastic part are configured to lock or unlock the optical disc drive module, and a first side surface is perpendicular to the second side surface.

18 Claims, 3 Drawing Sheets

OPTICAL DISC DRIVE INSTALLATION MECHANISM, AND OUTER FRAME FOR INSTALLING OPTICAL DISC DRIVE

CROSS-REFERENCE TO RELATED APPLICATIONS

This application is a continuation of International Application No. PCT/CN2013/070625, filed on Jan. 17, 2013, which claims priority to Chinese Patent Application No. 201210222885.0, filed on Jun. 29, 2012, both of which are hereby incorporated by reference in their entireties.

TECHNICAL FIELD

The present invention relates to the field of computer structures, and in particular, to an optical disc drive installation mechanism, and an outer frame for installing an optical disc drive.

BACKGROUND

A computer, as a modern intelligent electronic device that can automatically perform massive numerical calculations and various information processing at a high speed according to a prestored program, has attracted more attention and is widely used.

A computer mainly includes a hardware system and a software system, where the software system mainly includes an operating system and application software, the hardware system mainly includes a shelf (a power supply, a hard disk, a disk memory, a mainboard, a CPU, an optical disc drive, an audio card, a network adapter, a display adapter, and so on), a monitor, a keyboard, and a mouse, and an optical disc drive installation mechanism is disposed to facilitate installation of the optical disc drive in the shelf of the computer.

Currently, in the prior art, an optical disc drive mounting bracket is fixedly installed in a shelf of a computer by using an mounting hole (namely, a screw hole), a button is disposed on a front panel of the shelf, the button is connected to a push rod, the button is pressed to make the push rod drive a chain rod to rotate, another segment of the chain rod is clamped between a spring plate and the optical disc drive mounting bracket, and the chain rod plugs out the spring plate that is clamped into the screw hole on the optical disc drive mounting bracket, and then, the optical disc drive mounting bracket can be pulled out of a panel side of the shelf by pressing the button.

However, in a process of research and practice of the prior art, the inventor of the present invention finds that, in an existing implementation manner, because there are a lot of mechanisms in a shelf, and a mounting hole of a standard optical disc drive mounting bracket is an M2 screw hole, if a screw is used, installation is quite inconvenient, and there is still a risk of a short circuit of another mechanism caused by a screw falling into the shelf. That is, an existing operation of installing an optical disc drive module is complex, and an accuracy rate is not high, and consequently installation costs increase, and user experience decreases. Therefore, how to improve the efficiency in installing an optical disc drive mounting bracket and user experience becomes a technical problem to be solved currently.

SUMMARY

Embodiments of the present invention provide an optical disc drive installation mechanism, and an outer frame for installing an optical disc drive, so as to improve the efficiency of installing an optical disc drive module.

An embodiment of the present invention provides an optical disc drive installation mechanism, including: an optical disc drive module, a first elastic part, a spacing elastomer, and an outer frame which is configured to insert or pull out the optical disc drive module, where the optical disc drive module includes a buckle, and the buckle is fastened on a side surface of the optical disc drive module; the outer frame includes a buckle limiting hole which is configured to snap fit the buckle, and the buckle limiting hole is disposed on a first side surface of the outer frame; and the spacing elastomer is connected to a second side surface of the outer frame, the spacing elastomer is fastened on an inner wall on the second side surface of the outer frame, the spacing elastomer and the first elastic part are configured to lock or unlock the optical disc drive module, when the optical disc drive module is inserted into or pulled out of the outer frame, and the first side surface is perpendicular to the second side surface.

An embodiment of the present invention further provides an outer frame for installing an optical disc drive, where a first elastic part and a spacing elastomer are installed on the outer frame, a buckle limiting hole which is configured to snap fit a buckle is disposed on a first side surface of the outer frame, the optical disc drive module includes a buckle, and the buckle is fastened on the optical disc drive module; and a groove is further disposed on an outer wall on the first side surface of the outer frame, the groove is configured to fixedly connect to the first elastic part, a spacing elastomer is further included on a second side surface of the outer frame, the spacing elastomer is fastened on an inner wall on the second side surface of the outer frame, the spacing elastomer and the first elastic part are configured to lock or unlock the optical disc drive module, and the first side surface is perpendicular to the second side surface.

It can be known from the foregoing technical solutions that, in an optical disc drive installation mechanism, due to motion matching among parts of an optical disc drive module and an outer frame, installation is completed finally only by pushing the optical disc drive module into a guide rail of the outer frame; and if maintenance is needed, the optical disc drive module can be unlocked only by pressing a button of a first elastic part on the outer frame, so that the optical disc drive module is ejected from the outer frame, thereby facilitating installation and maintenance of operating personnel, improving the efficiency in installing an optical disc drive module, and also improving user experience.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
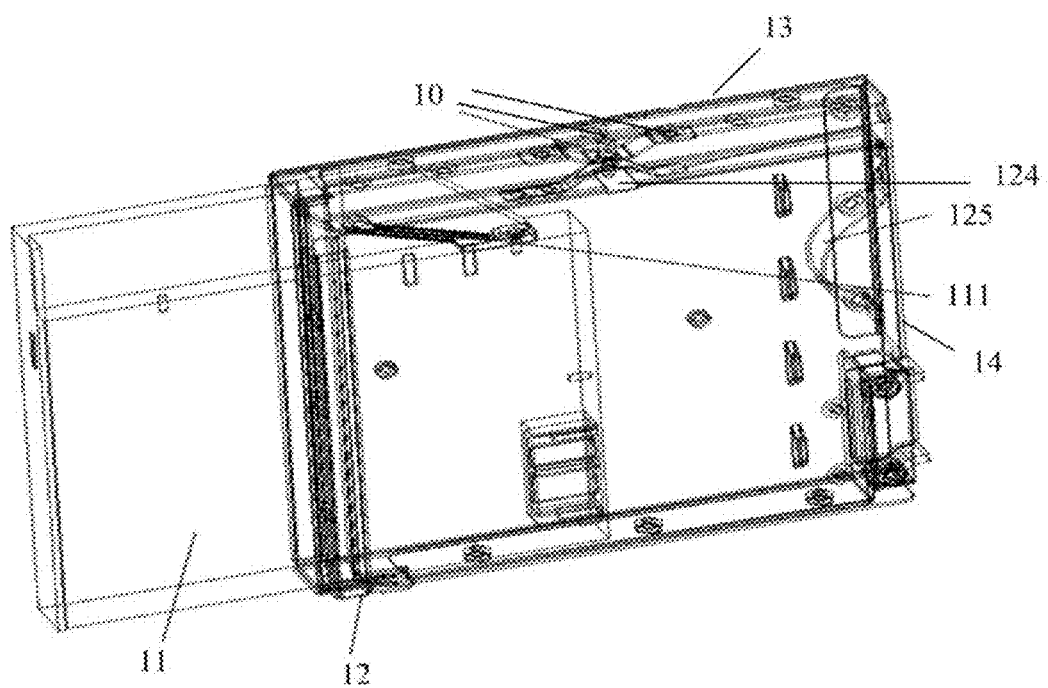
FIG. 1 is a schematic structural diagram of an optical disc drive installation mechanism according to an embodiment of the present invention.

Referring to FIG. 1, FIG. 1 is a schematic structural diagram of an optical disc drive installation mechanism according to an embodiment of the present invention. The optical disc drive installation mechanism includes: an optical disc drive module 11, a first elastic part 10, a spacing elastomer 125, and an outer frame 12 which is configured to insert or pull out the optical disc drive module. The optical disc drive module 11 includes a buckle 111, where the buckle 111 is fastened on a side surface of the optical disc drive module 11; a buckle limiting hole 124 which is configured to snap fit the buckle is disposed on a first side surface 13 of the outer frame 12; and a groove (which is not shown in the figure) is further disposed on an outer wall on the first side surface 13 of the outer frame 12, the groove is configured to fixedly connect to the first elastic part 10, the spacing elastomer 125 is further included on a second side surface of the outer frame, the spacing elastomer 125 is fastened on an inner wall on the second side surface 14 of the outer frame, the spacing elastomer 125 and the first elastic part 10 are configured to lock or unlock the optical disc drive module, and the first side surface is perpendicular to the second side surface.

According to the optical disc drive module 11 and the outer frame 12 which is configured to insert or pull out the optical disc drive module, the buckle 111 is fixedly connected to a side surface of the optical disc drive module; the buckle limiting hole 124 which is configured to snap fit the buckle is disposed on the outer wall on the first side surface 13 of the outer frame; and a groove is further disposed on the first side surface 13 of the outer frame, the groove is configured to fixedly connect to the first elastic part 14, the spacing elastomer 125 is fixedly connected to a second inner side surface 14 of the outer frame, the spacing elastomer 125 and the first elastic part 14 are configured to lock or unlock the optical disc drive module, and a first inner side is perpendicular to a second inner side.

In the embodiment, the fixedly connecting may be achieved by using a screw and a nut, or be achieved by using a rivet, which is not limited in the embodiment.

Optionally, in the foregoing embodiment, the optical disc drive module further includes: an L-shaped groove, where the L-shaped groove is disposed at an end of the buckle and configured to fasten the buckle.

Optionally, the buckle may be a cylinder or a cuboid of which two ends are thin and a middle part is thick, or certainly, or may be in another shape, on which no limitation is imposed in the embodiment.

Optionally, the whole buckle or a part of the buckle may be elastic. For example, the buckle may be a plastic member or a part of a rigid body (metal), and a corresponding clamping groove part may be an elastic piece, elastic plastic, or the like.

Optionally, the first elastic part may include: a button, a button elastic piece, and a stop piece, where the button elastic piece is an arch-shaped elastic piece, and a waist-shaped hole is disposed in the middle of the arch-shaped elastic piece; one end of the button elastic piece is fixedly connected to the outer wall on the first side surface of the outer frame, and the other end of the button elastic piece is suspended on the outer wall on the first side surface of the outer frame; one end of the stop piece and the other end of the button elastic piece are fastened on an inner lower part in the groove, and the other end of the stop piece is fastened on the outer wall on the first side surface of the outer frame; and one end of the button penetrates through the waist-shaped hole in the button elastic piece and is fastened on an inner upper part of the groove, and the other end of the button protrudes from the groove.

In an optional embodiment, the button is an elastic part; and when the button is an elastic part, the button and the button elastic piece in the foregoing embodiment may be replaced.

In another optional embodiment, the button may also be a set of motion mechanism that implements a function of pressing the buckle, for example, may be a chain rod, a gear, a pneumatic or electrical mechanism, or the like that presses the buckle.

Optionally, the button elastic piece may be: a spring, a tension spring, a rotary spring, an elastic buckle, an elastic pad, or the like, which is not limited in the embodiment.

Optionally, one end of the spacing elastomer is fixedly connected to the inner wall on the second side surface, the other end of the spacing elastomer is suspended on the inner wall on the second side surface, and the spacing elastomer is arch-shaped. That is, when being inserted into the outer frame, an optical disc drive module first touches the spacing elastomer, and along with insertion of the optical disc drive module, the optical disc drive module finally extrudes the spacing elastomer.

Optionally, the button elastic piece may be: a spring, a tension spring, a rotary spring, an elastic buckle, an elastic pad, or the like, which is not limited in the embodiment.

Optionally, to facilitate insertion of an optical disc drive module into the outer frame, the outer frame further includes: an oblique guide, where the oblique guide is fixedly connected to a third side surface of the outer frame, the oblique guide is configured to make the buckle smoothly slide into the outer frame, and the third side surface is perpendicular to the second side surface and parallel to the first side surface. In the embodiment, the oblique guide is an oblique surface made of sheet metal (but is not limited to the sheet metal), and a function of the oblique surface is to make the buckle smoothly slide into an outer frame. In addition, the oblique guide may be a part of the third side surface of the outer frame, or may be fixedly connected to the third side surface of the outer frame, which is not limited in the embodiment.

Optionally, when the optical disc drive module is inserted into the outer frame, the optical disc drive module touches and extrudes the spacing elastomer, one end of the buckle is snap fitted into the buckle limiting hole, and the other end protrudes from the buckle limiting hole; and when the optical disc drive module is pulled out of the outer frame, the button in the first elastic part presses the buckle, so that one end of the buckle snap fitted in the buckle limiting hole is ejected from the buckle limiting hole, and the spacing elastomer presses the optical disc drive module to make the optical disc drive module withdraw from the outer frame. For details about a specific process in which the optical disc drive module is inserted into or pulled out of the outer frame, refer to the following embodiments.

Figure 2:
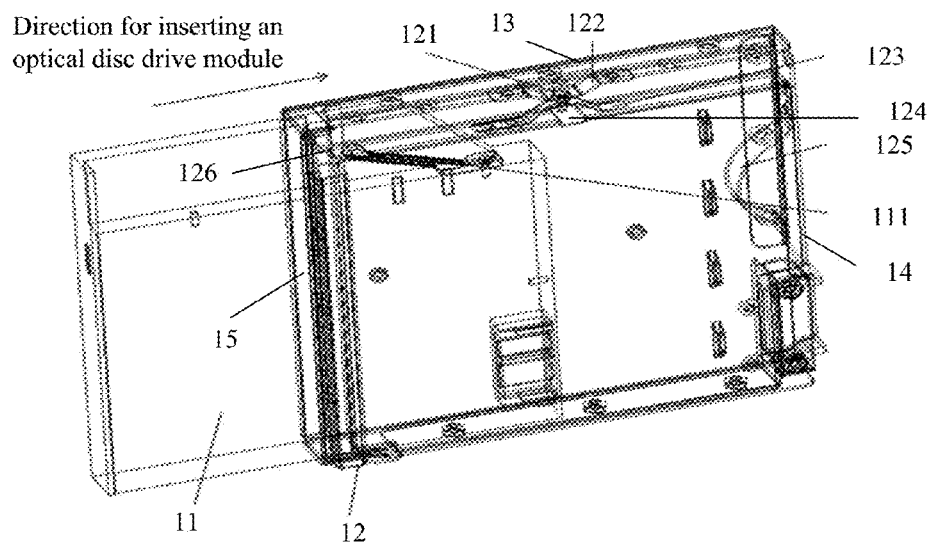
FIG. 2 is a schematic structural diagram of an optical disc drive module inserted on an outer frame according to an embodiment of the present invention.

Further, referring to FIG. 2, FIG. 2 is a schematic structural diagram of an optical disc drive module inserted into an outer frame according to an embodiment of the present invention. As shown in the figure, a buckle 111 is disposed on an inner surface (that is, a side surface which is of the outer frame and into which the optical disc drive module is inserted) on the optical disc drive module 11 (for example, a DVD module, a VCD module, a CD module, or the like); a groove (not shown in the figure) is disposed on an outer wall on a first side surface 13 of the outer frame 12, a button 121, a stop piece 122, and a button elastic piece 123 are fixedly connected to the outer wall on the first side surface, and are located in the groove; the button elastic piece 123 is an arch-shaped elastic piece, and a waist-shaped hole is disposed in the middle of the arch-shaped elastic piece; one end of the button elastic piece 123 is fixedly connected to the outer wall on the first side surface 13 of the outer frame 12, and the other end of the button elastic piece 123 is suspended on the outer wall on the first side surface of the outer frame 12; one end of the stop piece 122 and the other end of the button elastic piece 123 are fastened on an inner lower part of the groove, and the other end of the stop piece 122 is fastened on the outer wall on the first side surface of the outer frame 12; one end of the button 121 penetrates through the waist-shaped hole in the button elastic piece 123 and is fastened on an inner upper part of the groove, and the other end of the button 121 protrudes from the groove; and the spacing elastomer 125 is fixedly connected to an inner part on a second side surface 14 of the outer frame 12, the other end of the spacing elastomer 125 is suspended on an inner wall on the second side surface 14, and the spacing elastomer is arch-shaped. The first side surface 13 is perpendicular to the second side surface 14.

Based on the foregoing description, a process in which the optical disc drive module 11 is inserted into the outer frame 12 is that:

First, the optical disc drive module 11 is inserted from a third side surface 15 of the outer frame 12, the buckle 121 of the optical disc drive module 11 first slides into a guide rail (namely, upper and lower panes of the outer frame), and the buckle is compressed into the guide rail. According to an exemplary embodiment, the outer frame further includes: an oblique guide 126, where the oblique guide is fixedly connected to the third side surface of the outer frame, and is configured to facilitate insertion of the buckle into the guide rail. The third side surface 15 and the second side surface 14 are separately connected to the first side surface 13 in a perpendicular manner, and the third side surface 15 is parallel to the second side surface 14.

Then, the optical disc drive module 11 is pushed. If it is perceived that the optical disc drive module 11 touches the stop spring plate 125 and encounters resistance, pushing forward is continued, and, a sound is heard, which indicates that the buckle 111 is clamped into the buckle limiting hole 124 due to elasticity of the buckle.

Figure 3:
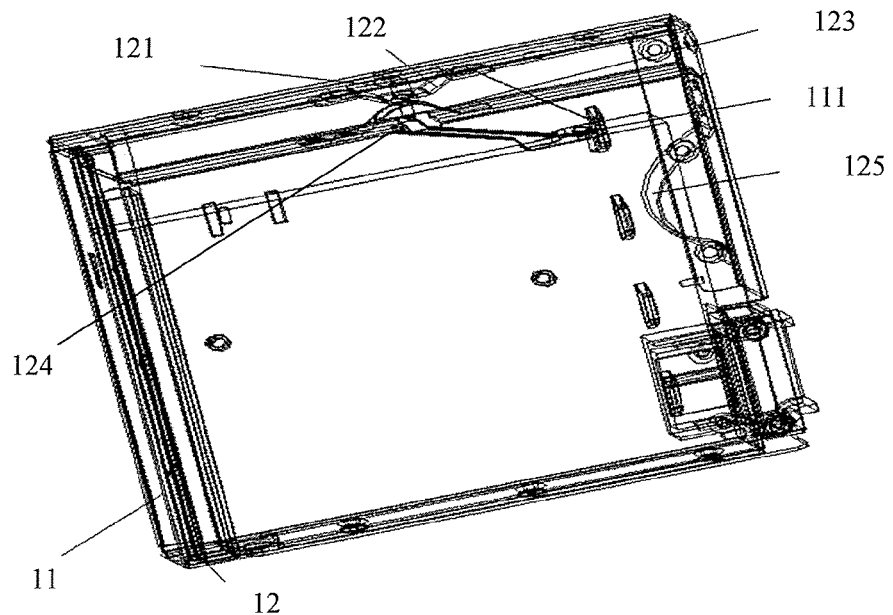
FIG. 3 is a schematic structural diagram of an optical disc drive module fastened on an outer frame according to an embodiment of the present invention.

Finally, the optical disc drive module 11 is automatically fastened on the outer frame 12, that is, the optical disc drive module 11 is inserted in place. For a schematic structural diagram of the optical disc drive module 11 inserted in place, refer to FIG. 3. FIG. 3 is a schematic structural diagram of an optical disc drive module fastened on an outer frame according to an embodiment of the present invention.

As shown in FIG. 3, after the optical disc drive module 11 is inserted in place, one end of a buckle 111 is clamped into a buckle limiting hole 124, the other end of the buckle protrudes from the buckle limiting hole 124 (the buckle limiting hole may be a concave clamping groove, but is not limited thereto), and is in contact with the button 121, so that when a button is pressed, the button presses the buckle to make the buckle be withdrawn from the buckle limiting hole.

After the optical disc drive module 11 is inserted in place, the button 121 is tightly pressed by the button elastic piece 123 on a lower surface of the stop piece 122 all the time. The spacing elastomer 125 is pressed by the optical disc drive module 11 to generate thrust opposite to a direction for inserting the optical disc drive module 11. The thrust makes the buckle 111 be clamped into the buckle limiting hole 124, and then, the optical disc drive module 11 is fastened and is not easy to withdraw from the outer frame.

Figure 4:
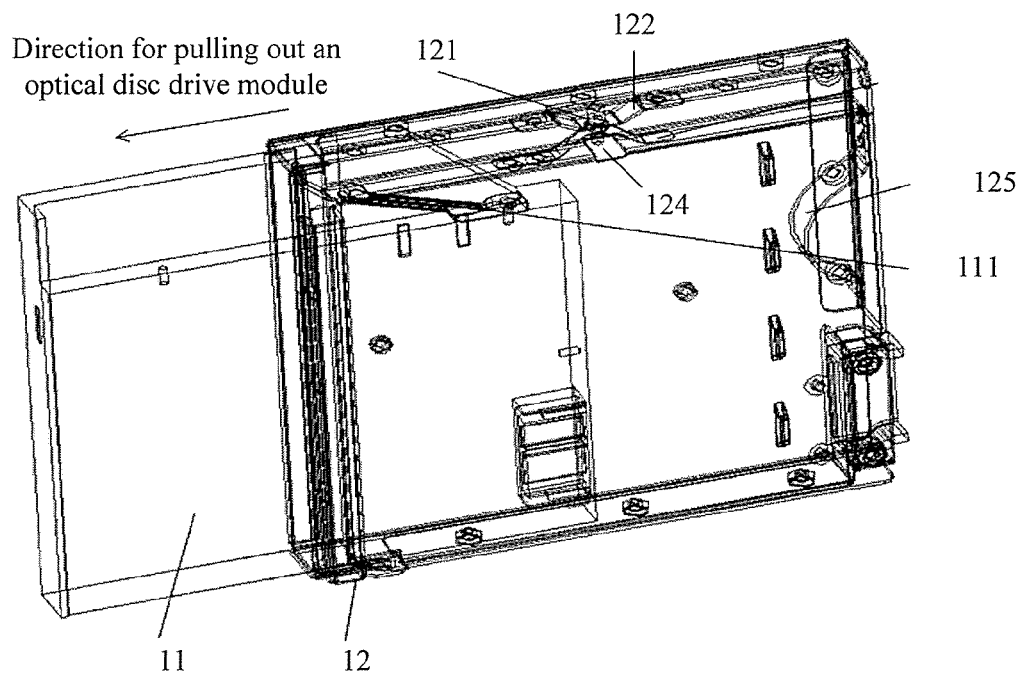
FIG. 4 is a schematic structural diagram of an optical disc drive module pulled out of an outer frame according to an embodiment of the present invention.

Further, referring to FIG. 4, FIG. 4 is a schematic structural diagram of an optical disc drive module pulled out of an outer frame according to an embodiment of the present invention. In the embodiment, after an optical disc drive module is inserted into an outer frame, and fastened, if maintenance is needed, the optical disc drive module needs to be pulled out of the outer frame, and a process in which the optical disc drive module is pulled out is that:

First, the button 121 is pressed, and the button 121 presses the buckle 111, so as to make the buckle 111 be withdrawn from the buckle limiting hole 124. After the buckle 121 is withdrawn from the buckle limiting hole 124, the spacing elastomer 125 presses the optical disc drive module 11, so as to make the optical disc drive module 11 move outwards. After the optical disc drive module 11 moves a distance, the optical disc drive module 11 can be held, so as to make the optical disc drive module 11 be pulled out of the outer frame 12.

Figure 5:
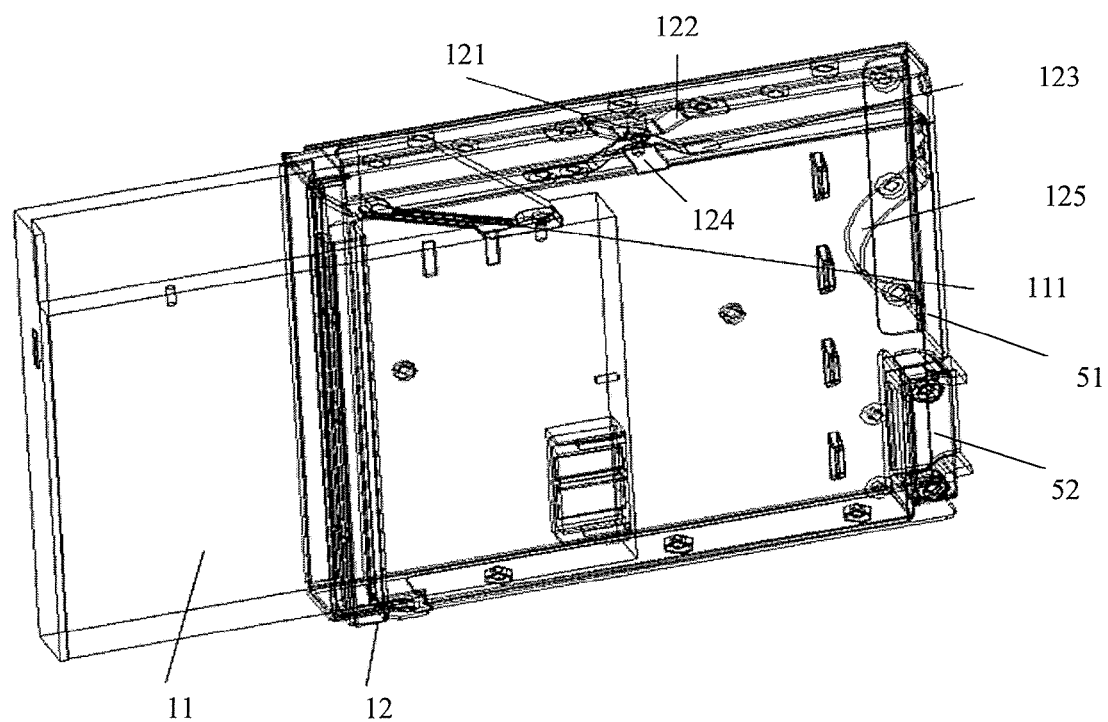
FIG. 5 is a diagram of an application example of an optical disc drive installation mechanism according to an embodiment of the present invention.

Further, referring to FIG. 5, FIG. 5 is a diagram of an application example of an optical disc drive installation mechanism according to an embodiment of the present invention. As shown in the figure, based on the foregoing embodiments, in an optional embodiment, the optical disc drive installation mechanism may further include: a micro switch or sensor 51, where the micro switch or sensor 51 is installed on an outer wall on a second side surface of the outer frame, and a position of the micro switch or sensor 51 may be located below the spacing elastomer; and the micro switch or sensor 51 is configured to indicate an installation state of the optical disc drive module, so as to facilitate fast installation of the optical disc drive module.

In another optional embodiment, the optical disc drive installation mechanism may further include: the floating connector 52, where the floating connector 52 is installed on the outer wall on the second side surface of the outer frame and at a position opposite to the optical disc drive module, and the floating connector 52 facilitates fast insertion and pullout of the optical disc drive module, that is, the floating connector 52 can avoid blind insertion and avoid a circumstance in which a connector in a shelf is damaged.

In the embodiment shown in FIG. 5, the micro switch or sensor may be only installed, or the floating connector may be only installed; or certainly, the micro switch or sensor, and the floating connector may be both installed, which is not limited in the embodiment.

In the embodiment of the present invention, in an optical disc drive installation mechanism, due to motion matching among parts of an optical disc drive module and an outer frame, installation is completed finally only by pushing the optical disc drive module into a guide rail of the outer frame; and if maintenance is needed, the optical disc drive module can be unlocked only by pressing a button on the outer frame, so that the optical disc drive module is ejected from the outer frame, thereby facilitating installation and maintenance of operating personnel, improving the efficiency in installing an optical disc drive module, and also improving user experience.

Further, in the embodiment of the present invention, the efficiency in installing an optical disc drive module can be further improved by installing a micro switch or sensor, and/or a floating connector.

In addition, an embodiment of the present invention further provides an outer frame for installing an optical disc drive, where a first elastic part and a spacing elastomer are installed on the outer frame, and a buckle limiting hole which is configured to snap fit a buckle is disposed on a first side surface of the outer frame; the buckle is fixedly connected to an optical disc drive module; and a groove is further disposed on an outer wall on the first side surface of the outer frame; the groove is configured to fixedly connect to the first elastic part, the spacing elastomer is fixedly connected to an inner wall on a second side surface of the outer frame, the spacing elastomer and the first elastic part are configured to lock or unlock the optical disc drive module, and the first side surface is perpendicular to the second side surface.

Optionally, the first elastic part may include: a button, a button elastic piece, and a stop piece, where the button elastic piece is an arch-shaped elastic piece, and a waist-shaped hole is disposed in the middle of the arch-shaped elastic piece, and no limitation, however, is imposed thereto.

One end of the button elastic piece is fixedly connected to the outer wall on the first side surface of the outer frame, and the other end of the button elastic piece is suspended on the outer wall on the first side surface of the outer frame.

One end of the stop piece and the other end of the button elastic piece are fastened on an inner lower part of the groove, and the other end of the stop piece is fastened on the outer wall on the first side surface of the outer frame.

One end of the button penetrates through the waist-shaped hole in the button elastic piece, and is fastened on an inner upper part of the groove, and the other end of the button protrudes from the groove.

Optionally, the button is an elastic part; or is a chain rod, a gear, a pneumatic or electrical part that presses a buckle.

Optionally, one end of the spacing elastomer is fixedly connected to an inner wall on the second side surface, the other end is suspended on the inner wall on the second side surface, the spacing elastomer is arch-shaped, and the spacing elastomer includes: a spring, a tension spring, a rotary spring, an elastic buckle, or an elastic pad.

Optionally, the button elastic piece includes: a spring, a tension spring, a rotary spring, an elastic buckle, or an elastic pad.

Optionally, an oblique guide is fixedly connected to a third side surface of the outer frame, the oblique guide makes the buckle smoothly slide into the outer frame, and the third side surface is perpendicular to a second side surface and parallel to a first side surface.

In addition, an embodiment of the present invention provides a computer, where the computer includes the foregoing optical disc drive installation mechanism, where the optical disc drive installation mechanism can be directly inserted into a shelf, a size of the optical disc drive installation mechanism is slightly less than a size of the shelf, so that the optical disc drive installation mechanism can just slide into the shelf along both upper and lower side surfaces of the shelf. Certainly, the optical disc drive installation mechanism may also be fastened in the shelf, which is not limited in the embodiment.

It should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or a device that includes a list of elements not only includes those elements but also includes other elements that are not expressly listed, or further includes elements inherent to such an article or device. An element preceded by "includes a . . . " does not, without more constraints, preclude the presence of additional identical elements in the article or apparatus that includes the element.

The foregoing descriptions are merely exemplary implementation manners of the present invention. It should be noted that a person of ordinary skill in the art may make several improvements or polishing without departing from the principle of the present invention and the improvements or polishing shall fall within the protection scope of the present invention.

What is claimed is:

1. An optical disc drive installation mechanism, comprising:
   an optical disc drive module comprising a buckle fastened on a side surface of the optical disc drive module;
   an outer frame which is configured to insert or pull out the optical disc drive module, the outer frame comprising a buckle limiting hole configured to snap fit the buckle and disposed on a first side surface of the outer frame;
   a first elastic part; and
   a spacing elastomer connected to a second side surface of the outer frame and fastened on an inner wall on the second side surface of the outer frame, wherein the spacing elastomer and the first elastic part are configured to lock or unlock the optical disc drive module when the optical disc drive module is inserted into or pulled out of the outer frame and the first side surface is perpendicular to the second side surface.

2. The optical disc drive installation mechanism according to claim 1, wherein the optical disc drive module further comprises:
   an L-shaped groove disposed at an end of the buckle and configured to fasten the buckle.

3. The optical disc drive installation mechanism according to claim 1, wherein the buckle is a cylinder or a cuboid of which two ends are thin and a middle part is thick.

4. The optical disc drive installation mechanism according to claim 1, wherein the buckle comprises elastic.

5. The optical disc drive installation mechanism according to claim 1, wherein:
   the outer frame further comprises a groove configured to fixedly connect to the first elastic part and disposed on an outer wall on the first side surface of the outer frame, and wherein the first elastic part comprises: a button, an arch-shaped button elastic piece having a waist-shaped hole disposed in the middle thereof, and a stop piece;
   one end of the button elastic piece is fixedly connected to the outer wall on the first side surface of the outer frame, and the other end of the button elastic piece is suspended on the outer wall on the first side surface of the outer frame;
   one end of the stop piece and the other end of the button elastic piece are fastened on an inner lower part of the groove, and the other end of the stop piece is fastened on the outer wall on the first side surface of the outer frame; and one end of the button penetrates through the waist-shaped hole in the button elastic piece, and is fastened on an inner upper part of the groove, and the other end of the button protrudes from the groove.

6. The optical disc drive installation mechanism according to claim 5, wherein the button is an elastic part, a chain rod, a gear, or a pneumatic or electrical part that presses the buckle.

7. The optical disc drive installation mechanism according to claim 1, wherein one end of the spacing elastomer is fixedly connected to the inner wall on the second side surface, the other end of the spacing elastomer is suspended on the inner wall on the second side surface, the spacing elastomer is arch-shaped and comprises: a spring, a tension spring, a rotary spring, an elastic buckle, or an elastic pad.

8. The optical disc drive installation mechanism according to claim 5, wherein the button elastic piece comprises: a spring, a tension spring, a rotary spring, an elastic buckle, or an elastic pad.

9. The optical disc drive installation mechanism according to claim 5, wherein:
   when the optical disc drive module is inserted into the outer frame, the optical disc drive module touches and extrudes the spacing elastomer, one end of the buckle is snap fitted into the buckle limiting hole, the other end of the buckle protrudes from the buckle limiting hole, and is in contact with the button in the first elastic part; and
   when the optical disc drive module is pulled out of the outer frame, the button in the first elastic part presses the buckle, so that one end of the buckle that is snap fitted into the buckle limiting hole is ejected from the buckle limiting hole, and the spacing elastomer presses the optical disc drive module to make the optical disc drive module be withdrawn from the outer frame.

10. The optical disc drive installation mechanism according to claim 1, wherein:
    the outer frame further comprises: an oblique guide fixedly connected to a third side surface of the outer frame and configured to make the buckle smoothly slide into the outer frame; and
    the third side surface is perpendicular to the second side surface and parallel to the first side surface.

11. The optical disc drive installation mechanism according to claim 1, further comprising a micro switch or sensor installed on the outer wall on the second side surface of the outer frame, and under the spacing elastomer.

12. The optical disc drive installation mechanism according to claim 1, further comprising a floating connector installed on the outer wall on the second side surface of the outer frame and in a position opposite to the optical disc drive module.

13. An outer frame for installing an optical disc drive, wherein a first elastic part and a spacing elastomer are installed on the outer frame, and a buckle limiting hole which is configured to snap fit a buckle is disposed on a first side surface of the outer frame, a optical disc drive module comprises a buckle, and the buckle is fastened on the optical disc drive module; and a groove is further disposed on an outer wall on the first side surface of the outer frame, the groove is configured to fixedly connect to the first elastic part, a spacing elastomer is further comprised on a second side surface of the outer frame, the spacing elastomer is fastened on an inner wall on the second side surface of the outer frame, the spacing elastomer and the first elastic part are configured to lock or unlock the optical disc drive module, and the first side surface is perpendicular to the second side surface.

14. The outer frame according to claim 13, wherein:
    the first elastic part comprises: a button, an arch-shaped button elastic piece having a waist-shaped hole disposed in the middle thereof, and a stop piece;
    one end of the button elastic piece is fixedly connected to the outer wall on the first side surface of the outer frame, and the other end of the button elastic piece is suspended on the outer wall on the first side surface of the outer frame;
    one end of the stop piece and the other end of the button elastic piece are fastened on an inner lower part of the groove, and the other end of the stop piece is fastened on the outer wall on the first side surface of the outer frame; and
    one end of the button penetrates through the waist-shaped hole in the button elastic piece, and is fastened on an inner upper part of the groove, and the other end of the button protrudes from the groove.

15. The outer frame according to claim 14, wherein the button is an elastic part, a chain rod, a gear, or a pneumatic or electrical part that presses a buckle.

16. The outer frame according to claim 13, wherein one end of the spacing elastomer is fixedly connected to the inner wall on the second side surface, the other end of the spacing elastomer is suspended on the inner wall on the second side surface, the spacing elastomer is arch-shaped and comprises: a spring, a tension spring, a rotary spring, an elastic buckle, or an elastic pad.

17. The outer frame according to claim 14, wherein the button elastic piece comprises: a spring, a tension spring, a rotary spring, an elastic buckle, or an elastic pad.

18. The outer frame according to claim 13, wherein:
    the outer frame further comprises: an oblique guide fixedly connected to a third side surface of the outer frame and configured to make the buckle smoothly slide into the outer frame; and
    the third side surface is perpendicular to the second side surface and parallel to the first side surface.

* * * * *